United States Patent
Shibata

(10) Patent No.: US 11,395,137 B2
(45) Date of Patent: Jul. 19, 2022

(54) COMMUNICATION DEVICE AND NON-TRANSITORY COMPUTER-READABLE RECORDING MEDIUM STORING COMPUTER-READABLE INSTRUCTIONS FOR COMMUNICATION DEVICE

(71) Applicant: Brother Kogyo Kabushiki Kaisha, Nagoya (JP)

(72) Inventor: Hiroshi Shibata, Yatomi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 638 days.

(21) Appl. No.: 16/360,132

(22) Filed: Mar. 21, 2019

(65) Prior Publication Data

US 2019/0306707 A1    Oct. 3, 2019

(30) Foreign Application Priority Data

Mar. 30, 2018  (JP) .............................. JP2018-068819

(51) Int. Cl.
*H04L 9/30* (2006.01)
*H04L 9/08* (2006.01)
(Continued)

(52) U.S. Cl.
CPC .......... *H04W 12/0431* (2021.01); *H04L 9/30* (2013.01); *H04W 12/06* (2013.01); *H04W 76/15* (2018.02)

(58) Field of Classification Search
CPC . H04W 12/0431; H04W 12/06; H04W 76/15; H04W 12/0471; H04W 12/50;
(Continued)

(56) References Cited

U.S. PATENT DOCUMENTS

2010/0082978 A1\* 4/2010 Suzuki ............... H04W 12/033
713/168
2016/0004490 A1   1/2016 Nagatani
(Continued)

FOREIGN PATENT DOCUMENTS

JP  2016-019042 A   2/2016
JP  2016-136704 A   7/2016
(Continued)

OTHER PUBLICATIONS

Wi-Fi Alliance Technical Committee P2P Task Group, "Wi-Fi Peer-to Peer (P2P) Technical Specification", Version 1.1, pp. 1-159, 2010.
(Continued)

*Primary Examiner* — Izunna Okeke
(74) *Attorney, Agent, or Firm* — Banner & Witcoff, Ltd.

(57) ABSTRACT

A communication device may display an instruction screen in a case where a first wireless connection is established between the communication device and a first external device; in a case where it is instructed that a target process is to be executed in a situation where the instruction screen is displayed, supply, to the first wireless interface, first instruction information; after the public key has been sent to the first external device, receive an authentication request from the first external device; send an authentication response to the first external device; receive connection information from the first external device; and in a case where the connection information is received from the first external device, establish, by using the connection information, the second wireless connection between the communication device and a second external device.

18 Claims, 9 Drawing Sheets

(51) Int. Cl.
*H04W 12/0431* (2021.01)
*H04W 12/06* (2021.01)
*H04W 76/15* (2018.01)

(58) Field of Classification Search
CPC ....... H04L 9/30; H04L 9/0841; H04L 9/3247; H04L 9/3273
USPC ........ 713/168, 171; 709/227, 228, 229, 230; 380/278
See application file for complete search history.

(56) References Cited

U.S. PATENT DOCUMENTS

| | | |
|---|---|---|
| 2016/0219433 A1 | 7/2016 | Naruse |
| 2017/0064756 A1 | 3/2017 | Abe |
| 2017/0215069 A1* | 7/2017 | Nakajima ........... H04L 63/0823 |
| 2018/0069718 A1 | 3/2018 | Terao |
| 2019/0215878 A1 | 7/2019 | Goto |
| 2022/0015161 A1 | 1/2022 | Goto |

FOREIGN PATENT DOCUMENTS

| | | |
|---|---|---|
| JP | 2017-050612 A | 3/2017 |
| JP | 2018-037978 A | 3/2018 |
| JP | 2018-042058 A | 3/2018 |

OTHER PUBLICATIONS

Wi-Fi Alliance, "DRAFT Device Provisioning Protocol Technical Specification", Version 0.2.11, pp. 1-133, 2017.
Mar. 1, 2022—(JP) Notification of Reasons for Rejection—App 2018-068819.
Epson, EP-880AB/EP-880AW EP880-AR/EP-880AN Start Guide, Jul. 2017, pp. 1-2, downloaded from <https://www2.epson.jp/support/manual/4134611_00.PDF>.

* cited by examiner (Network Access)

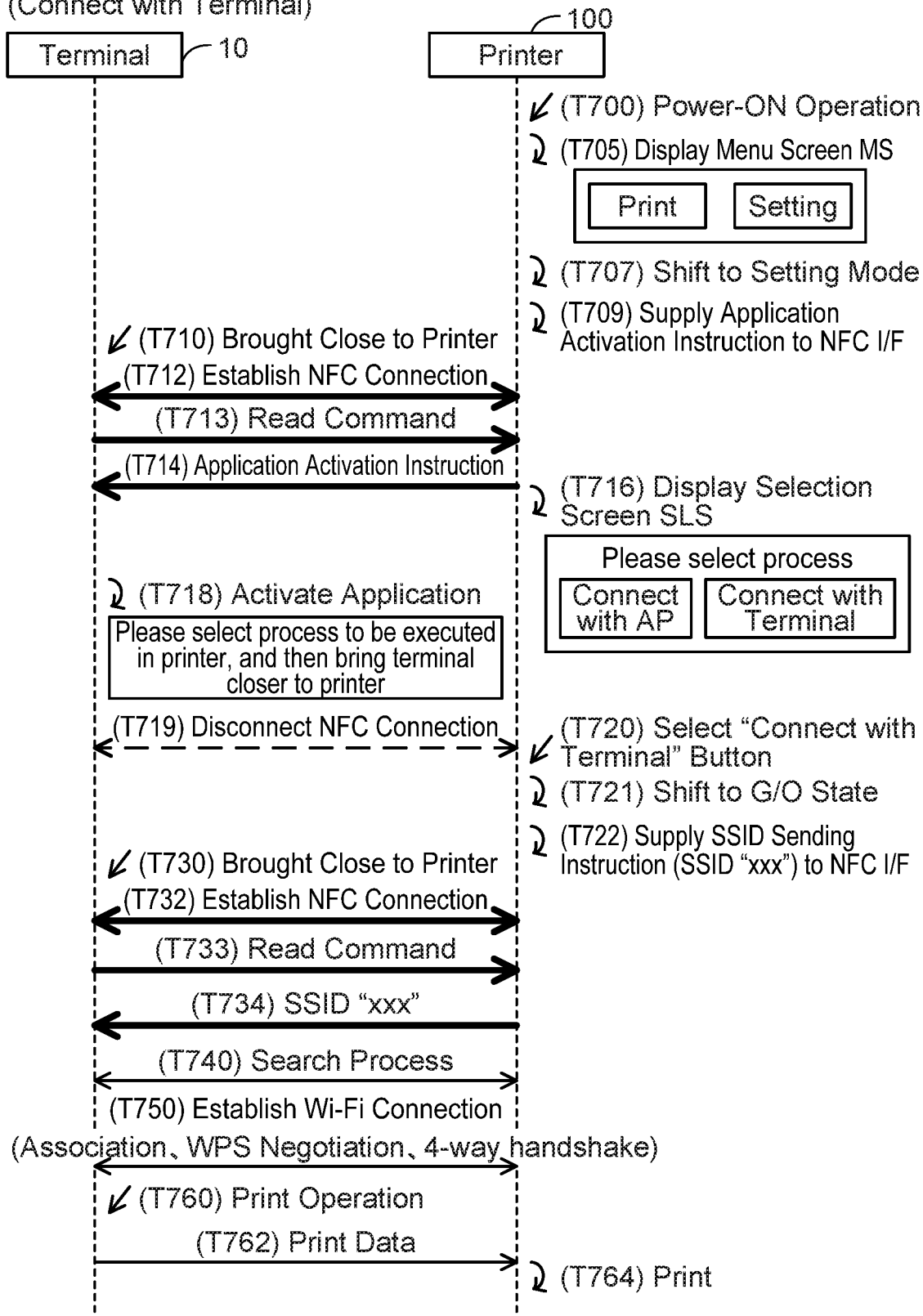

COMMUNICATION DEVICE AND NON-TRANSITORY COMPUTER-READABLE RECORDING MEDIUM STORING COMPUTER-READABLE INSTRUCTIONS FOR COMMUNICATION DEVICE

CROSS-REFERENCE

This application claims priority to Japanese Patent Application No. 2018-068819, filed on Mar. 30, 2018, the entire contents of which are incorporated herein by reference.

TECHNICAL FIELD

The description herein discloses a technique related to a communication device configured to establish a wireless connection with an external device.

BACKGROUND ART

A wireless communication scheme called Device Provisioning Protocol (hereinbelow termed "DPP scheme") that is to be established by the Wi-Fi Alliance is known. In the DPP scheme, wireless communication according to the DPP scheme is executed, for example, in response to a Near Field Communication (NFC) connection being established between a first device and a second device.

SUMMARY

The disclosure herein discloses a novel technique for establishing a second wireless connection between a communication device and a second external device by using a first external device.

A communication device disclosed herein may comprise: a display unit; a first wireless interface; a second wireless interface different from the first wireless interface; and a controller configured to: in a case where a first wireless connection is established between the communication device and a first external device via the first wireless interface, cause the display unit to display an instruction screen for instructing that a target process which includes sending of a public key is to be executed; in a case where it is instructed that the target process is to be executed in a situation where the instruction screen is displayed, supply, to the first wireless interface, first instruction information for instructing the sending of the public key, wherein in a case where it is not instructed that the target process is to be executed in the situation where the instruction screen is displayed, the first instruction information is not supplied to the first wireless interface, and after the first instruction information has been obtained from the controller, the first wireless interface sends the public key to the first external device; after the public key has been sent to the first external device, receive an authentication request in which the public key is used from the first external device via the second wireless interface; in a case where the authentication request is received from the first external device, send an authentication response to the first external device via the second wireless interface; after the authentication response has been sent to the first external device, receive connection information from the first external device via the second wireless interface, the connection information being for establishing a second wireless connection between the communication device and a second external device via the second wireless interface; and in a case where the connection information is received from the first external device, establish, by using the connection information, the second wireless connection between the communication device and the second external device via the second wireless interface.

Another communication device disclosed herein may comprise: a first wireless interface; a second wireless interface different from the first wireless interface; and a controller configured to: after a first wireless connection has been established between the communication device and a first external device via the first wireless interface, shift an operation state of the communication device from a non-respondent state to a respondent state, the non-respondent state being a state in which an authentication response is not sent in response to receiving an authentication request in which a public key is used from the first external device, the respondent state being a state in which the authentication response is sent to the first external device in response to receiving the authentication request from the first external device, wherein after the first wireless connection has been established, the first interface sends the public key to the first external device; after the public key has been sent to the first external device, receive the authentication request from the first external device via the second wireless interface; in a case where the authentication request is received from the first external device after the operation state of the communication device has been shifted to the respondent state, send the authentication response to the first external device via the second wireless interface; after the authentication response has been sent to the first external device, receive connection information from the first external device via the second wireless interface, the connection information being for establishing a second wireless connection between the communication device and a second external device via the second wireless interface; and in a case where the connection information is received from the first external device, establish, by using the connection information, the second wireless connection between the communication device and the second external device via the second wireless interface.

Computer programs for realizing the above communication devices, and non-transitory computer-readable recording media that store these computer programs are also novel and useful. Further, methods performed by the above communication devices are also novel and useful. In addition, communication systems comprising the above communication devices and another device (e.g., the first external device, the second external device) are also novel and useful.

BRIEF DESCRIPTION OF THE DRAWINGS

FIG. 9 shows a sequence diagram of a process to establish a Wi-Fi connection between a printer and a terminal.

EMBODIMENT (Configuration of Communication System 2; FIG. 1)

As shown in FIG. 1, a communication system 2 is provided with an Access Point (AP) 6, a terminal 10, and a printer 100. In this embodiment, a situation is assumed in which a user uses the terminal 10 to establish a wireless connection according to a Wi-Fi scheme (hereinbelow termed "Wi-Fi connection") between the printer 100 and the AP 6.

(Configuration of Terminal 10)

Figure 1:
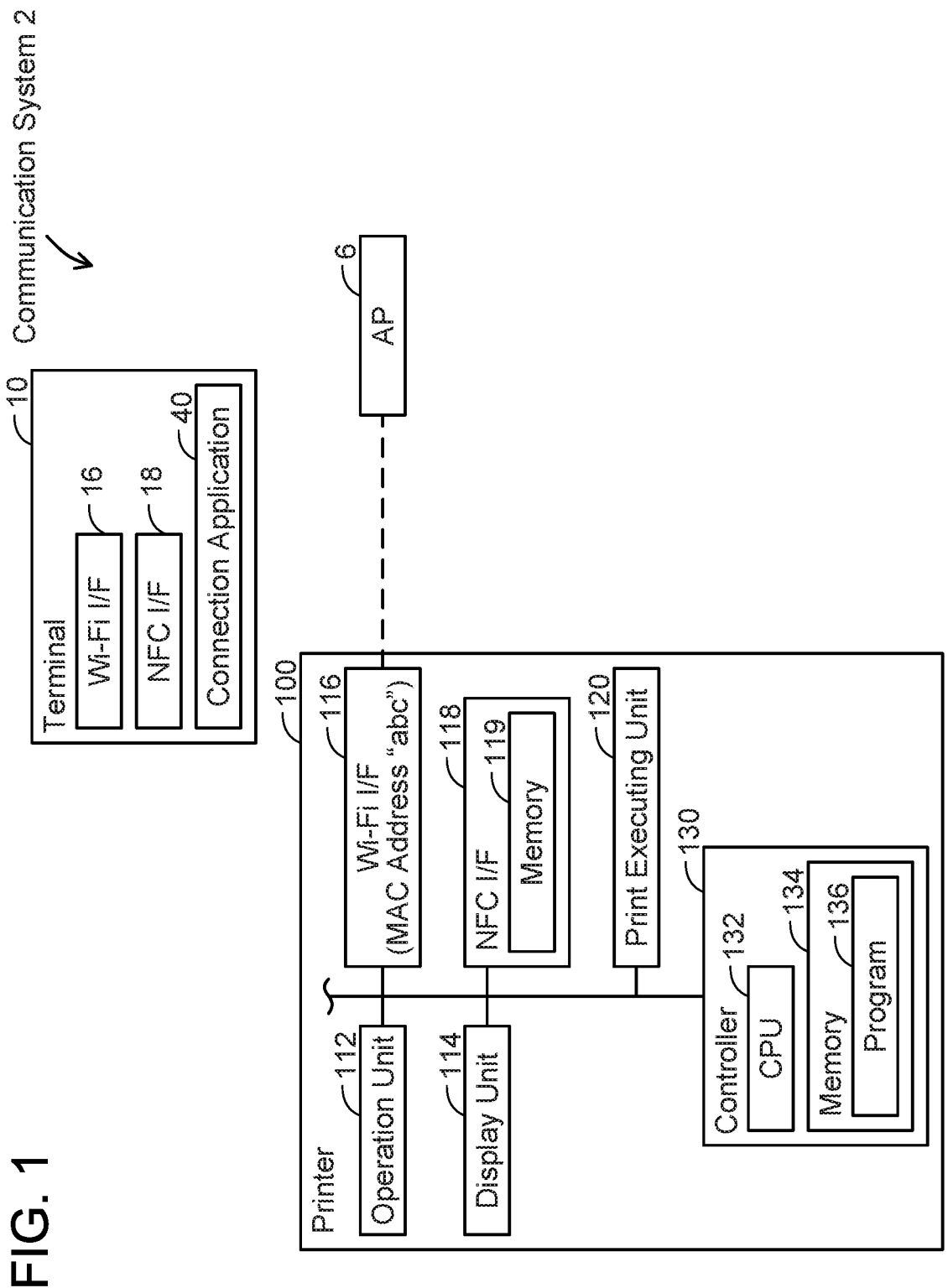
FIG. 1 shows a configuration of a communication system.

The terminal 10 is a mobile terminal device such as a cellphone (such as a smartphone), a PDA, or a tablet PC. In a variant, the terminal 10 may be a stationary PC, or a laptop PC. The terminal 10 is provided with a Wi-Fi interface 16 and an NFC interface 18. Hereinbelow, an interface will be denoted simply as "I/F". The camera 15 is a device for capturing an image of an object, and in this embodiment, it is used especially to capture a QR code for the AP 6 and the printer 100. Further, the terminal 10 stores a connection application 40 (hereinbelow termed simply as "app 40"). The app 40 is a program for establishing the Wi-Fi connection between the printer 100 and the AP 6, and may be installed to the terminal 10, for example, from a server on the Internet provided by a vendor of the printer 100.

The Wi-Fi I/F 16 is a wireless interface configured to execute Wi-Fi communication according to the Wi-Fi scheme. The Wi-Fi scheme is a wireless communication scheme for executing wireless communication according to 802.11 standard of IEEE (the Institute of Electrical and Electronics Engineers, Inc.) and standards complying thereto (such as 802.11a, 11b, 11g, 11n, etc.), for example. Especially, the Wi-Fi I/F 16 supports a Wi-Fi Direct (registered trademark; WFD) scheme established by the Wi-Fi Alliance and a Device Provisioning Protocol (DPP) scheme that is to be established by the Wi-Fi Alliance. The WFD scheme is a wireless communication scheme described in the standard "Wi-Fi Peer-to-Peer (P2P) Technical Specification Version 1.1" created by the Wi-Fi Alliance. In a WFD standard, three states, namely, a Group Owner state (hereinbelow termed "G/O state"), a client state, and a device state, are defined as states of a WFD device. A WFD device can operate selectively in one of the aforementioned three states. The DPP scheme is described in the standard draft "DRAFT Device Provisioning Protocol Technical Specification Version 0.2.11" created by the Wi-Fi Alliance, and is a wireless communication scheme for easily establishing a Wi-Fi connection between a pair of devices (such as the printer 100 and the AP 6) by using the terminal 10.

The NFC I/F 18 is an I/F for executing NFC communication according to an NFC scheme. The NFC scheme is a wireless communication scheme based on international standards such as ISO/IEC 14443, 15693, 18092. As types of I/Fs for executing NFC communication, an I/F called an NFC forum device and an I/F called an NFC forum tag are known. In this embodiment, the NFC I/F 18 is an NFC forum device.

(Configuration of Printer 100)

The printer 100 is a peripheral (e.g., a peripheral of the terminal 10) capable of executing a print function. The printer 100 is provided with an operation unit 112, a display unit 114, a Wi-Fi I/F 116, an NFC I/F 118, a print executing unit 120, and a controller 130. The respective units 112 to 130 are connected to a bus line (for which a reference sign is not given).

The operation unit 112 is provided with a plurality of keys. The user can input various instructions to the printer 100 by operating the operation unit 112. The display unit 114 is a display configured to display various types of information. The print executing unit 120 includes a print mechanism of an inkjet scheme or a laser scheme.

The Wi-Fi I/F 116 is similar to the Wi-Fi I/F 16 of the terminal 10. That is, the Wi-Fi I/F 116 supports the WFD scheme and the DPP scheme. Due to this, the printer 100 can establish the Wi-Fi connection with the AP 6 according to the DPP scheme, and further can establish a Wi-Fi connection with the terminal 10 according to the WFD scheme. Further, the Wi-Fi I/F 116 is assigned with a MAC address "abc". The NFC I/F 118 is similar to the NFC I/F 18 of the terminal 10 except for being an NFC forum tag. In a variant, the NFC I/F 118 may be an NFC forum device. Further, the NFC I/F 118 includes a memory 119.

Here, differences between Wi-Fi communication and NFC communication will be described. A communication speed of Wi-Fi communication (a maximum communication speed of 11 to 600 Mbps, for example) is faster than a communication speed of NFC communication (a maximum communication speed of 100 to 424 Kbps, for example). Further, a frequency of carrier waves used in Wi-Fi communication (2.4 GHz band or 5.0 GHz band, for example) is different from a frequency of carrier waves used in NFC communication (13.56 MHz band, for example). Further, a maximum distance with which Wi-Fi communication can be executed (about 100 m at maximum, for example) is greater than a maximum distance with which NFC communication can be executed (about 10 cm at maximum, for example).

The controller 130 includes a CPU 132 and a memory 134. The CPU 132 is configured to execute various processes according to a program 136 stored in the memory 134. The memory 134 is constituted of a volatile memory, a nonvolatile memory and the like.

(Specific Examples; FIGS. 2 to 9)

Next, specific examples of processes executed by the respective devices 6, 10, 100 will be described with reference to FIGS. 2 to 9. Firstly, a process for establishing a Wi-Fi connection between the printer 100 and the AP 6 will be described with reference to FIGS. 2 to 8.

Figure 2:
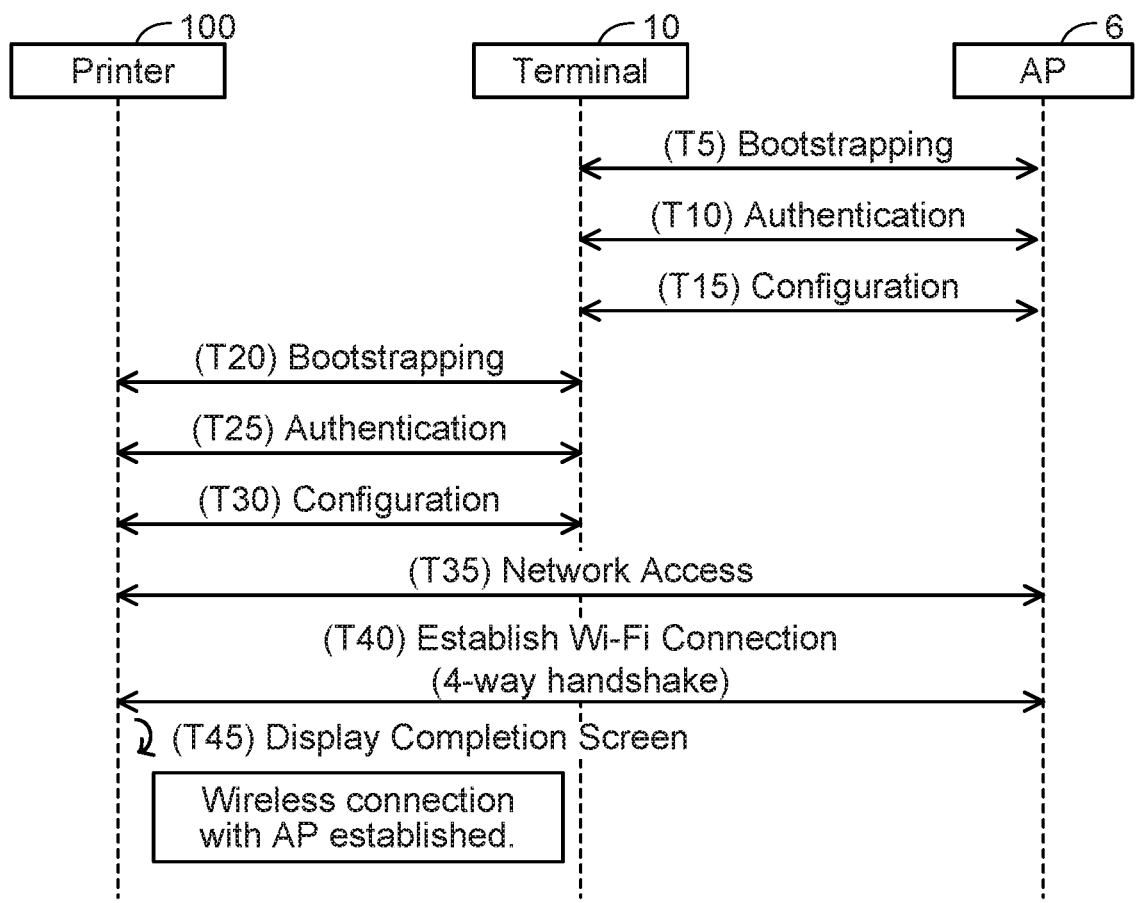
FIG. 2 shows an explanatory diagram explaining an overview of an embodiment.

(Overview of process for connection with AP 6; FIG. 2)

Firstly, an overview of the process for establishing the Wi-Fi connection between the printer 100 and the AP 6 will be described with reference to FIG. 2. As aforementioned, the terminal 10 and the printer 100 support the DPP scheme, and further the AP 6 also supports the DPP scheme. In this embodiment, the Wi-Fi connection between the printer 100 and the AP 6 is established by each of the devices 6, 10, 100 executing communication according to the DPP scheme. Hereinbelow, to facilitate understanding, operations which CPUs (such as the CPU 132) of the respective devices execute will be described with the devices (such as the printer 100) as subjects of action instead of describing the operations with the CPUs as the subjects of action.

In T5, the terminal 10 executes Bootstrapping (hereinbelow termed simply as "BS") according to the DPP scheme with the AP 6. This BS is a process of providing information that is to be used in Authentication (hereinbelow termed simply as "Auth") of T10 (to be described later) from the AP 6 to the terminal 10 in response to a QR code adhered to the AP 6 being captured by the terminal 10.

In T10, the terminal 10 executes Auth according to the DPP scheme with the AP 6 by using the information obtained in the BS of T5. This Auth is a process for the terminal 10 and the AP 6 to authenticate their communication counterparts.

In T15, the terminal 10 executes Configuration (hereinbelow termed simply as "Config") according to the DPP scheme with the AP 6. This Config is a process of sending information for establishing the Wi-Fi connection between the printer 100 and the AP 6 to the AP 6. Specifically, in the Config, the terminal 10 creates a first Configuration Object (hereinbelow, Configuration Object is simply be termed "CO") for establishing the Wi-Fi connection between the printer 100 and the AP 6, and sends the first CO to the AP 6. As a result, the first CO is stored in the AP 6.

Next, in T20, the terminal 10 executes a BS according to the DPP scheme with the printer 100. This BS is a process of providing information to be used in an Auth in T25 (to be described later) from the printer 100 to the terminal 10 by using an NFC connection established between the NFC I/F 18 of the terminal 10 and the NFC I/F 118 of the printer 100.

In T25, the terminal 10 executes Auth according to the DPP scheme with the printer 100 by using the information obtained in the BS of T20. This Auth is a process for the terminal 10 and the printer 100 to authenticate their communication counterparts.

In T30, the terminal 10 executes Config according to the DPP scheme with the printer 100. This Config is a process of sending information for establishing the Wi-Fi connection between the printer 100 and the AP 6 to the printer 100. In this Config, the terminal 10 creates a second CO for establishing the Wi-Fi connection between the printer 100 and the AP 6, and sends the second CO to the printer 100. As a result, the second CO is stored in the printer 100.

In T35, the printer 100 and the AP 6 use the stored first and second COs to execute Network Access (hereinbelow termed simply as "NA") according to the DPP scheme. The NA is a process of sharing a connection key for establishing the Wi-Fi connection between the printer 100 and the AP 6.

In T40, the printer 100 and the AP 6 execute 4way-handshake communication. In at least a part of the 4way-handshake communication, the printer 100 and the AP 6 communicate encrypted information encrypted by the connection key shared in the NA in T35. Further, in a case where decryption of the encrypted information succeeds, the Wi-Fi connection is established between the printer 100 and the AP 6. Due to this, the printer 100 can participate, as a child station, in a wireless network formed by the AP 6, as a result of which the printer 100 can execute communication via the AP 6 with other devices participating in the wireless network. In a variant, the printer 100 and the AP 6 may execute Simultaneous Authentication of Equals (SAE, also called "Dragonfly") communication, instead of the 4way-handshake communication.

In T45, the printer 100 causes the display unit 114 to display a completion screen indicating that the Wi-Fi connection has been established with the AP 6. When the process of T45 is completed, the process of FIG. 2 is terminated.

In the DPP scheme, in order to establish the Wi-Fi connection between the printer 100 and the AP 6, the user does not need to input information of the wireless network in which the AP 6 operates as a parent station (such as a Service Set Identifier (SSID) and a password) to the printer 100. As such, the user can easily establish the Wi-Fi connection between the printer 100 and the AP 6.

(Description on Respective Processes; FIGS. 3 to 8)

Next, details of the respective processes executed in T20 to T35 of FIG. 2 will be described with reference to FIGS. 3 to 8. Since the processes of T5 to T15 are similar to the processes of T20 to T30 except that the AP 6 is used instead of the printer 100, the detailed description thereof will be omitted. Further, FIG. 3, FIG. 7 and FIG. 8 respectively show different cases of the BS executed between the terminal 10 and the printer 100. These cases are processes executed in one embodiment.

Figure 3:
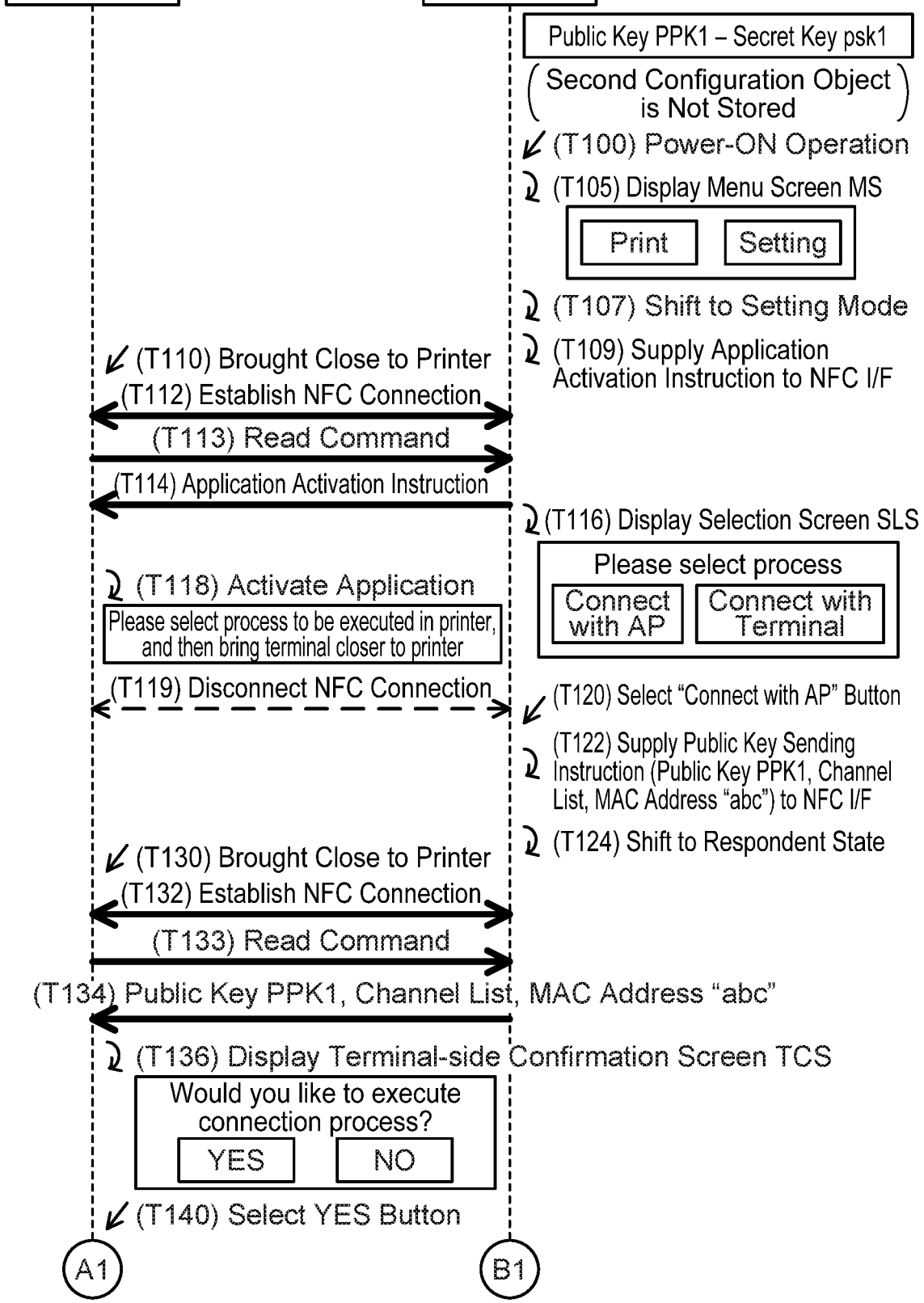
FIG. 3 shows a sequence diagram of a Bootstrapping process of Case A.

(Bootstrapping (BS) of Case A; FIG. 3)

Firstly, a process of the BS of Case A in T20 of FIG. 2 will be described with reference to FIG. 3. In an initial state of FIG. 3, the memory 134 of the printer 100 stores in advance a public key PPK1 and a secret key psk1 of the printer 100.

In response to accepting a power-ON operation by the user in T100, the printer 100 causes the display unit 114 to display a menu screen MS in T105. The screen MS is a default screen of the printer 100 in other words, and includes a print button for causing the printer 100 to execute print and a setting button for designating various settings (such as print setting) of the printer 100.

Since the memory 134 has not yet stored the second CO (see T30 of FIG. 2), the printer 100 shifts an operation mode of the NFC I/F 118 from a non-setting mode to a setting mode in T107. As such, in the state where the memory 134 does not store the second CO, the operation mode of the NFC I/F 118 is shifted automatically from the non-setting mode to the setting mode simply by the user turning on a power of the printer 100. The non-setting mode is a state in which power is not supplied to the NFC I/F 118 and is a mode in which the NFC connection cannot be established. The setting mode is a state in which the power is supplied to the NFC I/F 118 and is a mode in which the NFC connection can be established.

In T109, the printer 100 (that is, the CPU 132) supplies the NFC I/F 118 with an app activation instruction for activating the app 40 installed in the terminal 10. As a result, in the NFC I/F 118, the app activation instruction is stored in the memory 119.

In response to the terminal 10 being brought closer to the printer 100 by the user in T110, an NFC connection is established between the NFC I/F 18 of the terminal 10 and the NFC I/F 118 of the printer 100 in T112. In this case, in response to receiving a Read command from the NFC I/F 18 by using this NFC connection in T113, the NFC I/F 118 sends the app activation instruction in the memory 119 to the NFC I/F 18 by using the NFC connection in T114. As a result, in T118, the app 40 of the terminal 10 is activated. As above, user's convenience is improved since the app 40 is activated by the user simply bringing the terminal 10 close to the printer 100.

In response to receiving from the NFC I/F 118 a notification indicating that the app activation instruction has been sent, the printer 100 (that is, the CPU 132) causes the display unit 114 to display a selection screen SLS in T116. The screen SLS includes a "Connect with AP" button indicating that the process for establishing the Wi-Fi connection with the AP 6 is to be executed, and a "Connect with Terminal" button indicating that the process for establishing the Wi-Fi connection with the terminal 10 is to be executed.

When the app 40 is activated in T118, the terminal 10 executes following processes according to the app 40. Specifically, the terminal 10 firstly displays a notification screen. This notification screen includes a message that prompts the user to bring the terminal 10 closer to the printer 100 after selecting a process in the printer. Then, the terminal 10 supplies the NFC I/F 18 with information instructing to disconnect the NFC connection that was established in T112. As a result, in T119, the NFC connection is disconnected.

In response to the "Connect with AP" button in the screen SLS being selected by the user in T120, the printer 100 (that is, the CPU 132) supplies the NFC I/F 118 in T122 with a public key sending instruction for instructing to send a public key. The public key sending instruction includes the public key PPK1 of the printer 100 that is stored in the memory 134 in advance, a channel list stored in the memory 134 in advance, and the MAC address "abc" of the Wi-Fi I/F 116. The channel list is information indicating a plurality of communication channels preset in the printer 100 (that is, a plurality of communication channels which the printer 100 is capable of using). In response to obtaining the public key sending instruction, the NFC I/F 118 stores the public key PPK1, the channel list and the MAC address "abc", which are included in the public key sending instruction, in the memory 119.

Next, in T124, the printer 100 shifts from a non-respondent state to a respondent state. The non-respondent state is a state in which the Wi-Fi I/F 116 does not send a DPP Authentication Response (hereinbelow simply termed "ARes") (see T210 of FIG. 4 to be described later) even if a DPP Authentication Request (hereinbelow simply termed "AReq") is received from the terminal 10 (see T200 to be described later). The respondent state is a state in which the Wi-Fi I/F 116 sends the ARes to the terminal 10 in response to receiving the AReq from the terminal 10. That is, the printer 100 shifts to a state of being able to execute the Auth (see T25 of FIG. 2) by shifting from the non-respondent state to the respondent state. Specifically, in this embodiment, the non-respondent state is a state in which even if the Wi-Fi I/F 116 receives a signal from outside, it does not supply the signal to the CPU 132. Further, the respondent state is a state in which in response to receiving a signal from outside, the Wi-Fi I/F 116 supplies the signal to the CPU 132 and sends a response for this signal. Since the respondent state is a state in which the CPU 132 processes the signal received from outside, processing load in that state is higher than that in the non-respondent state. In a variant, the non-respondent state may be a state in which electricity is not supplied to the Wi-Fi I/F 116, and the respondent state may be a state in which electricity is supplied to the Wi-Fi I/F 116. Further, in another variant, the non-respondent state may be a state in which even if the Wi-Fi I/F 116 receives the AReq from outside, the Wi-Fi I/F 116 does not supply a notification that the AReq has been received to the CPU 132, and the respondent state may be a state in which in response to receiving the AReq from outside, the Wi-Fi I/F 116 supplies a notification that the AReq has been received to the CPU 132.

T130 to T133 are similar to T110 to T113. In T134, the NFC I/F 118 of the printer 100 sends the public key PPK1, the channel list, and the MAC address "abc" in the memory 119 to the NFC I/F 18 of the terminal 10 by using the NFC connection established in T132. As a result, the public key PPK1 of the printer 100, the channel list, and the MAC address "abc" are obtained by the terminal 10.

In T136, the terminal 10 displays a terminal-side confirmation screen TCS for inquiring the user whether or not to execute a connection process for establishing the Wi-Fi connection between the printer 100 and the AP 6. The screen TCS includes a YES button indicating that the connection process is to be executed and a NO button indicating that the connection process is not to be executed. In T140, the terminal 10 accepts a selection of the YES button in the screen TCS by the user. When the process of T140 is completed, the process of the BS of Case A is terminated.

Figure 4:
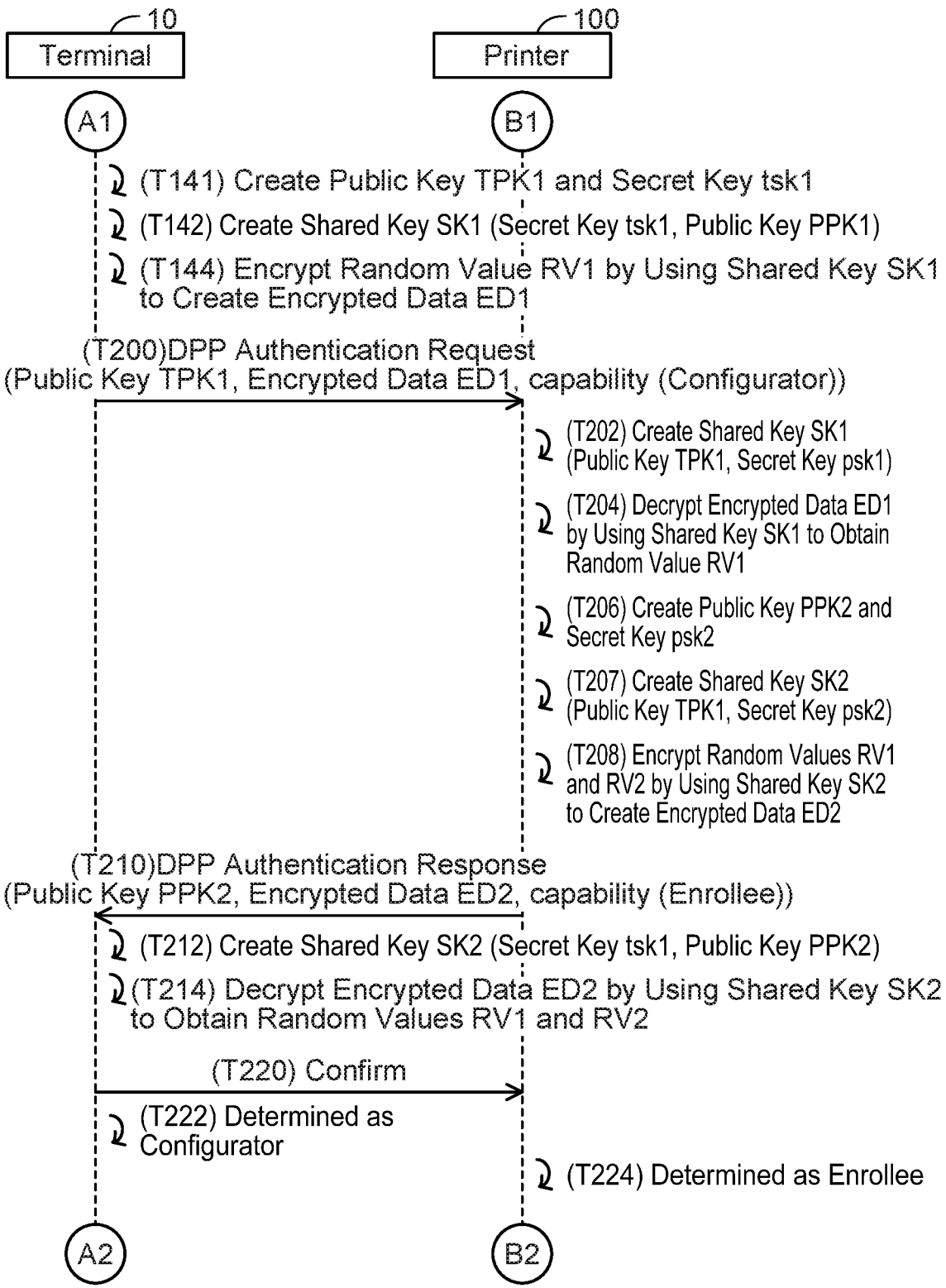
FIG. 4 shows a sequence diagram of an Authentication process.

(Authentication (Auth); FIG. 4)

Next, the process of the Auth in T25 of FIG. 2 will be described with reference to FIG. 4. In response to the YES button in the screen TCS being selected by the user in T140 of FIG. 3, the terminal 10 creates a public key TPK1 and a secret key tsk1 of the terminal 10 in T141. Next, in T142, the terminal 10 creates a shared key SK1 according to Elliptic curve Diffie-Hellman key exchange (ECDH) by using the created secret key tsk1 and the public key PPK1 of the printer 100 obtained in T134 of FIG. 3. Then, in T144, the terminal 10 creates encrypted data ED1 by using the created shared key SK1 to encrypt a random value RV1.

In T200, the terminal 10 sends an AReq via the Wi-Fi I/F 16 to the printer 100 by setting the MAC address "abc" obtained in T134 of FIG. 3 as its destination. The AReq is a signal for requesting the printer 100 to execute authentication. Here, the terminal 10 repeats sending the AReq to the printer 100 by sequentially using the plurality of communication channels in the channel list obtained in T134. The AReq includes the public key TPK1 of the terminal 10 created in T141, the encrypted data ED1 created in T144, and a capability of the terminal 10.

The capability is information that is pre-designated in a device supporting the DPP scheme, and includes any one of the following values: a value indicating that this device is capable of operating only as a Configurator according to the DPP scheme, a value indicating that this device is capable of operating only as an Enrollee according to the DPP scheme, and a value indicating that this device is capable of operating whichever one of the Configurator and the Enrollee. The Configurator refers to a device configured to send a CO used in the NA (T35 of FIG. 2) to an Enrollee in the Config (T30 of FIG. 2). On the other hand, the Enrollee refers to a device that receives the CO used in the NA from the Configurator in the Config. As above, in this embodiment, the terminal 10 creates the first and second COs and sends them respectively to the AP 6 and the printer 100. As such, the capability of the terminal 10 includes the value indicating that it is capable of operating only as the Configurator.

The printer 100 receives the AReq from the terminal 10 via the Wi-Fi I/F 116 in T200. As above, this AReq is sent with the MAC address "abc" of the printer 100 as the destination. As such, the printer 100 can suitably receive this AReq from the terminal 10.

Further, when the printer 100 shifts to the respondent state in T124 of FIG. 3, it monitors receipt of the AReq by using one communication channel among the plurality of communication channels in the channel list. As above, the AReq in T200 is sent by sequentially using the plurality of communication channels in the channel list. As such, the printer 100 can suitably receive this AReq from the terminal 10.

Next, the printer 100 executes following processes for authenticating the sender of the AReq (that is, the terminal 10). Specifically, firstly, in T202, the printer 100 creates a shared key SK1 according to the ECDH by using the public key TPK1 of the terminal 10 in the AReq and the secret key psk1 of the printer 100 stored in advance in the memory 134. Here, the shared key SK1 created by the terminal 10 in T142 and the shared key SK1 created by the printer 100 in T204 are identical to each other. Thus, the printer 100 can suitably decrypt the encrypted data ED1 in the AReq by using the created shared key SK1 in T204, as a result of which it can obtain the random value RV1. In a case where the decryption of the encrypted data ED1 succeeds, the printer 100 determines that the sender of this AReq is the device with which the NFC connection was established in T132 of FIG. 3, that is, determines that the authentication succeeded, and executes processes from T206. On the other hand, in a case where the decryption of the encrypted data ED1 does not succeed, the printer 100 determines that the sender of this AReq is not the device with which the NFC connection was established in T132, that is, determines that the authentication failed, and does not execute the processes from T206.

In T206, the printer 100 creates a new public key PPK2 and a new secret key psk2 of the printer 100. In a variant, the public key PPK2 and the secret key psk2 may be stored in advance in the memory 134. Next, in T207, the printer 100 creates a shared key SK2 according to the ECDH by using the public key TPK1 of the terminal 10 in the AReq of T200 and the created secret key psk2 of the printer 100. Then, in T208, the printer 100 creates encrypted data ED2 by using the created shared key SK2 to encrypt the obtained random value RV1 and a new random value RV2.

In T210, the printer 100 sends an ARes to the terminal 10 via the Wi-Fi I/F 116. This ARes includes the public key PPK2 of the printer 100 created in T206, the encrypted data ED2 created in T208, and a capability of the printer 100. This capability includes the value indicating that the printer 100 is capable of operating only as the Enrollee.

In response to receiving the ARes from the printer 100 via the Wi-Fi I/F 16 in T210, the terminal 10 executes following processes for authenticating the sender of the ARes (that is, the printer 100). Specifically, firstly in T212, the terminal 10 creates a shared key SK2 according to the ECDH by using the secret key tsk1 of the terminal 10 created in T141 and the public key PPK2 of the printer 100 in the ARes. Here, the shared key SK2 created by the printer 100 in T207 and the shared key SK2 created by the terminal 10 in T212 are identical to each other. Thus, the terminal 10 can suitably decrypt the encrypted data ED2 in the ARes by using the created shared key SK2 in T214, as a result of which it can obtain the random values RV1 and RV2. In a case where the decryption of the encrypted data ED2 succeeds, the terminal 10 determines that the sender of this ARes is the device with which the NFC connection was established in T132 of FIG. 3, that is, determines that the authentication succeeded, and executes processes from T220. On the other hand, in a case where the decryption of the encrypted data ED2 does not succeed, the terminal 10 determines that the sender of this ARes is not the device with which the NFC connection was established in T132, that is, determines that the authentication failed, and does not execute the processes from T220.

In T220, the terminal 10 sends a Confirm to the printer 100 via the Wi-Fi I/F 16. The Confirm includes information indicating that the terminal 10 operates as the Configurator and the printer 100 operates as the Enrollee. As a result, the terminal 10 determines to operate as the Configurator in T222, and the printer 100 determines to operate as the Enrollee in T224. When the process of T224 is completed, the process of FIG. 4 is terminated.

Figure 5:
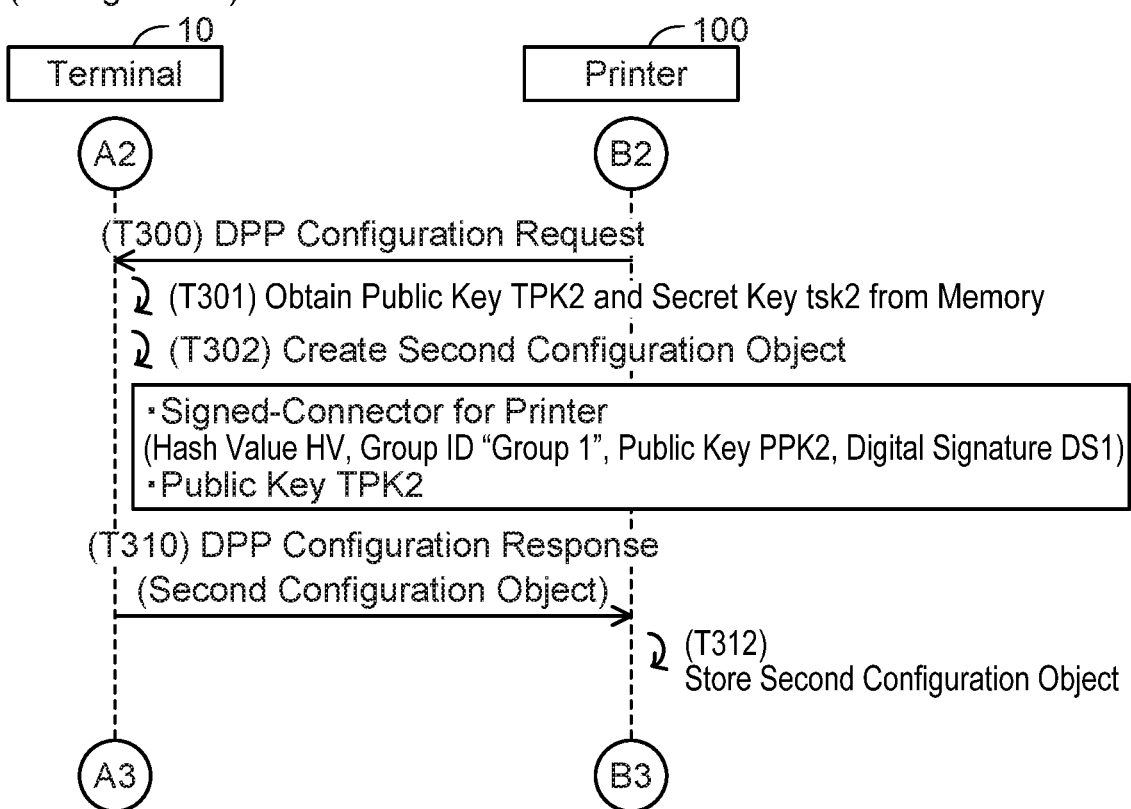
FIG. 5 shows a sequence diagram of a Configuration process.

(Configuration (Config); FIG. 5)

Next, the process of Config in T30 of FIG. 2 will be described with reference to FIG. 5. In T300, the printer 100 sends a DPP Configuration Request (hereinbelow termed simply as "CReq") to the terminal 10 via the Wi-Fi I/F 116. This CReq is a signal requesting the CO (that is, the information for establishing the Wi-Fi connection between the printer 100 and the AP 6) to be sent.

The terminal 10 receives the CReq from the printer 100 in T300 via the Wi-Fi I/F 16. In this case, the terminal 10 obtains a group ID "Group1", a public key TPK2, and a secret key tsk2 from a memory (not shown) of the terminal 10 in T301. As aforementioned, the terminal 10 have already executed the Config in T15 of FIG. 2 with the AP 6, and at that occasion the terminal 10 created the group ID "Group1", the public key TPK2, and the secret key tsk2 and stored the same in the memory. The group ID "Group1" is information for identifying a wireless network formed by the Wi-Fi connection being established between the printer 100 and the AP 6. In a variant, a character string designated by the user may be used as the group ID. That is, in T301, the terminal 10 obtains the respective information that were stored in T15 of FIG. 2. Next, in T302, the terminal 10 creates the second CO (see T30 of FIG. 2). Specifically, the terminal 10 executes following processes.

The terminal 10 creates a hash value HV by hashing the public key TPK2 of the terminal 10. Further, the terminal 10 creates a specific value by hashing a combination of the hash value HV, the group ID "Group1", and the public key PPK2 of the printer 100 in the ARes in T210 of FIG. 4. Then, the terminal 10 creates a digital signature DS1 by using the secret key tsk2 of the terminal 10 to encrypt the created specific value in accordance with an Elliptic Curve Digital Signature Algorithm (ECDSA). As a result, the terminal 10 can create a Signed-Connector for printer (hereinbelow, the Signed-Connector is termed simply as "SCont") including the hash value HV, the group ID "Group1", the public key PPK2 of the printer 100, and the digital signature DS1. Further, the terminal 10 creates the second CO including the SCont for printer and the public key TPK2 of the terminal 10.

In T310, the terminal 10 sends a DPP Configuration Response (hereinbelow termed simply as "CRes") including the second CO to the printer 100 via the Wi-Fi I/F 16.

The printer 100 receives the CRes from the terminal 10 in T310 via the Wi-Fi I/F 116. In this case, the printer 100 stores the second CO in the CRes in the memory 134 in T312. When the process of T312 is completed, the process of FIG. 5 is terminated.

Figure 6:
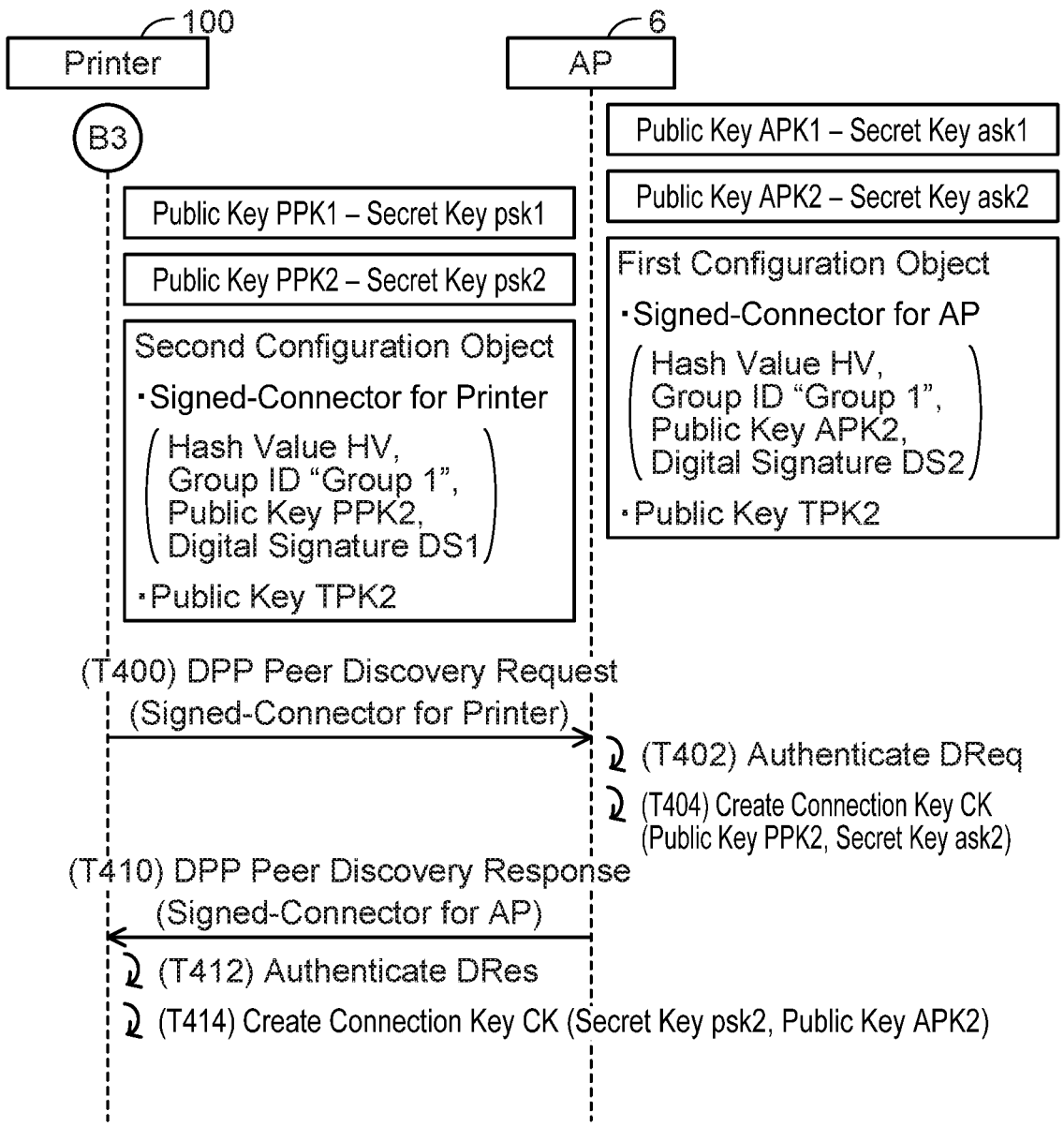
FIG. 6 shows a sequence diagram of a Network Access process.

(Network Access (NA); FIG. 6)

Next, the process of the NA in T35 of FIG. 2 executed between the printer 100 and the AP 6 will be described with reference to FIG. 6. As aforementioned, the processes of T5 to T15 of FIG. 2 have already been executed between the terminal 10 and the AP 6, similarly to T20 to T30 of FIG. 2. However, the AP 6 does not execute the processes of T105 to T134 of FIG. 3. The AP 6 stores in advance a public key APK1 and a secret key ask1 of the AP 6. Further, a QR code, which is obtained by coding the public key APK1 of the AP 6, a channel list of the AP 6, and a MAC address of the AP 6, is adhered to a housing of the AP 6. Processes similar to the processes from T136 are executed between the terminal 10 and the AP 6 when the terminal 10 captures this QR code. As a result, the AP 6 stores a public key APK2 and a secret key ask2 of the AP 6 (see T206 of FIG. 4), and further stores the first CO received from the terminal 10 (see T312 of FIG. 5). The first CO includes a SCont for AP and a public key TPK2 of the terminal 10. This public key TPK2 is identical to the public key TPK2 included in the second CO. Further, the SCont for AP includes a hash value HV, a group ID "Group1", the public key APK2 of the AP 6, and a digital signature DS2. This hash value HV and this group ID "Group1" are respectively identical to the hash value HV and the group ID "Group1" included in the second CO. The digital signature DS2 is information in which a specific value, which is obtained by hashing a combination of the hash value HV, the group ID "Group1", and the public key APK2, is encrypted by the secret key tsk2 of the terminal 10, and is a value different from the digital signature DS1 included in the second CO.

In T400, the printer 100 sends a DPP Peer Discovery Request (hereinbelow termed simply as "DReq") including the SCont for printer to the AP 6 via the Wi-Fi I/F 116. This DReq is a signal requesting the AP 6 to execute authentication and send the SCont for AP.

In response to receiving the DReq from the printer 100 in T400, the AP 6 executes a process for authenticating the sender of the DReq (that is, the printer 100) and the information in the DReq (that is, the hash value HV, the "Group1", and the public key PPK2). Specifically, in T402, the AP 6 firstly executes a first AP determination process that is regarding whether or not the hash value HV and the group ID "Group1" in the received SCont for printer are respectively identical to the hash value HV and the group ID "Group1" in the SCont for AP included in the stored first CO. In the case of FIG. 6, the AP 6 determines "identical" in the first AP determination process, thus it determines that the authentication of the sender of the DReq (that is, the printer 100) succeeds. Here, the fact that the hash value HV in the received SCont for printer is identical to the hash value HV in the SCont for AP included in the stored first CO means that the SCont for printer and the SCont for AP were created by the same device (that is, the terminal 10). As such, the AP 6 also determines that authentication of the creator of the received SCont for printer (that is, the terminal 10) succeeds. Further, the AP 6 decrypts the digital signature DS1 in the received SCont for printer by using the public key TPK2 of the terminal 10 included in the stored first CO. Since the decryption of the digital signature DS1 succeeds in the case of FIG. 6, the AP 6 executes a second AP determination process that is regarding whether or not a specific value obtained by decrypting the digital signature DS1 is identical to a value obtained by hashing the information in the received SCont for printer (that is, the hash value HV, the "Group1", and the public key PPK2). In the case of FIG. 6, the AP 6 determines "identical" in the second AP determination process, thus it determines that the authentication of the information in the DReq succeeds, and executes processes from T404. The fact that the AP6 determines "identical" in the second AP determination process means that the information in the received SCont for printer (that is, the hash value HV, the "Group1", and the public key PPK2) has not been tampered by a third party since the second CO was stored in the printer 100. On the other hand, in a case where the AP 6 determines "not identical" in the first AP determination process, in a case where the decryption of the digital signature DS1 fails, or in a case where the AP 6 determines "not identical" in the second AP determination process, the AP 6 determines that the authentication fails and does not execute the processes from T404.

Next, in T404, the AP 6 creates a connection key CK (that is, a shared key) by using the obtained public key PPK2 of the printer 100 and the stored secret key ask2 of the AP 6 in accordance with the ECDH.

In T410, the AP 6 sends a DPP Peer Discovery Response (hereinbelow termed simply as "DRes") including the SCont for AP to the printer 100.

In response to receiving the DRes from the AP 6 in T410 via the Wi-Fi I/F 116, the printer 100 executes a process for authenticating the sender of the DRes (that is, the AP 6) and the information in the DRes (that is, the hash value HV, the "Group1", and the public key APK2). Specifically, in T412, the printer 100 firstly executes a first PR determination process that is regarding whether or not the hash value HV and the group ID "Group1" in the received SCont for AP are respectively identical to the hash value HV and the group ID "Group1" in the SCont for printer included in the stored second CO. In the case of FIG. 6, the printer 100 determines "identical" in the first PR determination process, thus it determines that the authentication of the sender of the DRes (that is, the AP 6) succeeds. The fact that the hash value HV in the received SCont for AP is identical to the hash value HV in the SCont for printer included in the stored second CO means that the SCont for printer and the SCont for AP were created by the same device (that is, the terminal 10). As such, the printer 100 also determines that authentication of the creator of the received SCont for AP (that is, the terminal 10) succeeds. Further, the printer 100 decrypts the digital signature DS2 in the received SCont for AP by using the public key TPK2 of the terminal 10 included in the stored second CO. Since the decryption of the digital signature DS2 succeeds in the case of FIG. 6, the printer 100 executes a second PR determination process that is regarding whether or not a specific value obtained by decrypting the digital signature DS2 is identical to a value obtained by hashing the information in the received SCont for AP (that is, the hash value HV, the "Group1", and the public key APK2). In the case of FIG. 6, the printer 100 determines "identical" in the second PR determination process, thus it determines that the authentication of the information in the DRes succeeds, and executes processes from T414. The fact that the printer 100 determines "identical" in the second PR determination process means that the information in the received SCont for AP (that is, the hash value HV, the "Group1", and the public key APK2) has not been tampered by a third party since the first CO was stored in the AP 6. On the other hand, in a case where the printer 100 determines "not identical" in the first PR determination process, in a case where the decryption of the digital signature DS2 fails, or in a case where the printer 100 determines "not identical" in the second PR determination process, the printer 100 determines that the authentication fails and does not execute the processes from T414.

In T414, the printer 100 creates a connection key CK by using the stored secret key psk2 of the printer 100 and the public key APK2 of the AP 6 in the received SCont for AP in accordance with the ECDH. Here, the connection key CK created by the AP 6 in T404 and the connection key CK created by the printer 100 in T414 are identical to each other. Due to this, the connection key CK for establishing the Wi-Fi connection is shared between the printer 100 and the AP 6. When T414 is completed, the process of FIG. 6 is terminated.

As aforementioned, after the connection key CK is shared between the printer 100 and the AP 6, the printer 100 and the AP 6 execute the 4way-handshake communication by using the connection key CK in T40 of FIG. 2. As a result, the Wi-Fi connection is established between the printer 100 and the AP 6. As aforementioned, the printer 100 receives the AReq in T200 of FIG. 4 from the terminal 10 by using one communication channel among the plurality of communication channels included in the channel list of the printer 100. That is, the printer 100 receives the AReq in T200 from the terminal 10 by using the communication channel which both the printer 100 and the terminal 10 can use. On the other hand, in T40 of FIG. 2, the printer 100 establishes the Wi-Fi connection with the AP 6 by using the communication channel which both the printer 100 and the AP 6 can use. Here, the communication channel which the terminal 10 can use and the communication channel which the AP 6 can use may differ in some cases. In this embodiment, the communication channel by which the printer 100 receives the AReq from the terminal 10 in T200 of FIG. 4 is different from the communication channel by which the printer 100 establishes the Wi-Fi connection with the AP 6 in T40 of FIG. 2. However, in a variant, the former communication channel may be same as the latter communication channel.

Figure 7:
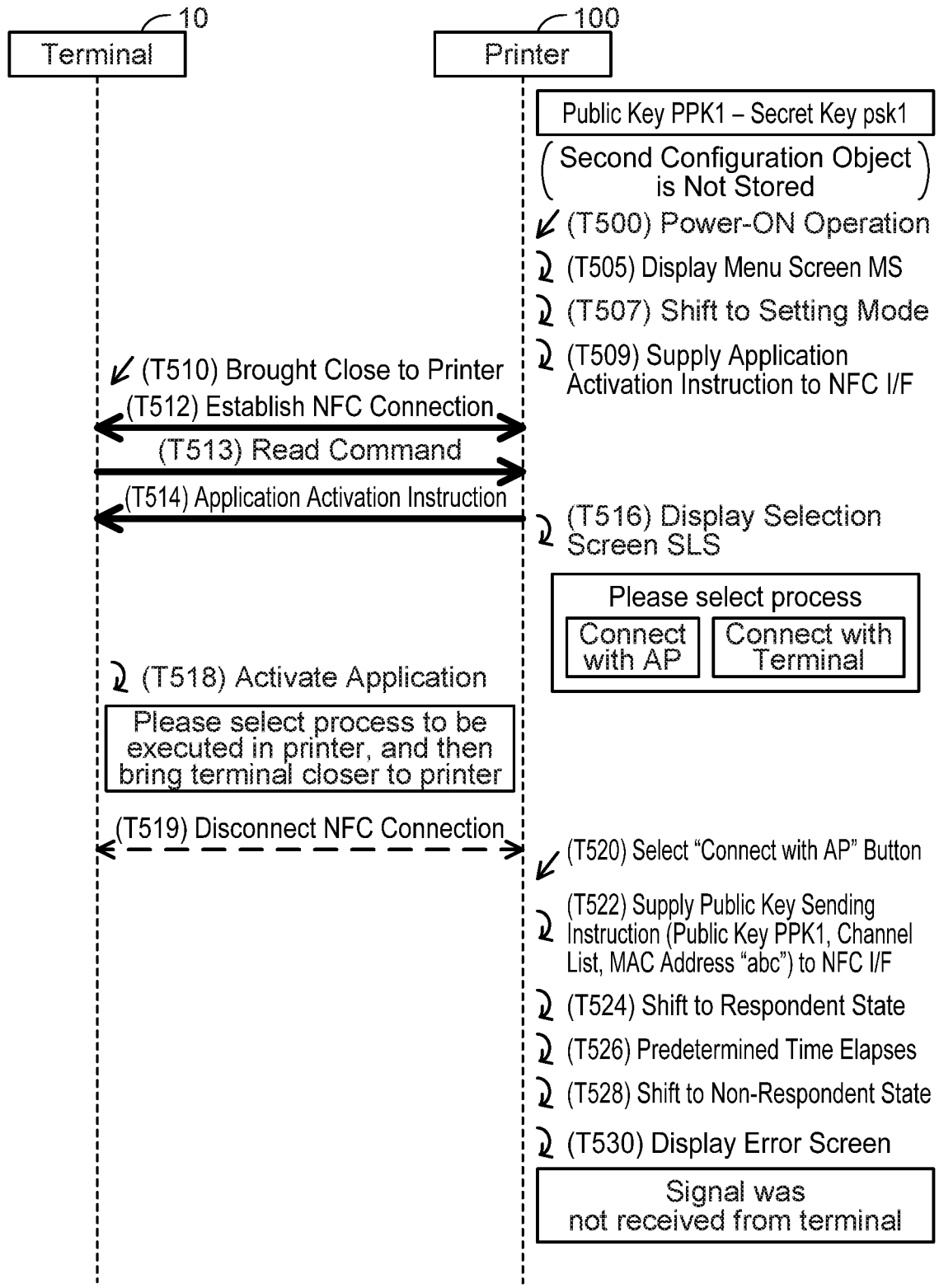
FIG. 7 shows a sequence diagram of a Bootstrapping process of Case B.

(Bootstrapping (BS) of Case B; FIG. 7)

Next, the process of the BS of T20 in FIG. 2 of Case B will be described with reference to FIG. 7. Case B is a state before T20 to T40 of FIG. 2 are executed, that is, a state in which the memory 134 of the printer 100 has not yet stored the second CO. Further, Case B assumes a situation in which the terminal 10 is not brought close to the printer 100 again after the app 40 was activated in the terminal 10 (T118 of FIGS. 3).

T500 to T524 are similar to T100 to T124 of FIG. 3. In the present case, since the terminal 10 is not brought close to the printer 100 again, the processes from T130 are not executed. That is, since the public key PPK1 of the printer 100, the channel list, and the MAC address "abc" are not obtained by the terminal 10, the AReq is not sent to the printer 100 from the terminal 10. In this case, the printer 100 determines in T526 that it has not received the AReq within a predetermined time since it shifted to the respondent state in T524, and shifts from the respondent state to the non-respondent state in T528. Due to this, the respondent state can be suppressed from continuing over a long period of time in the printer 100. By so doing, the processing load on the printer 100 can be reduced. Then, in T530, the printer 100 causes the display unit 114 to display an error screen indicating that the AReq was not received from the terminal 10. When the process of T530 is completed, the process of FIG. 7 is terminated, and communication according to the DPP scheme is cancelled.

Figure 8:
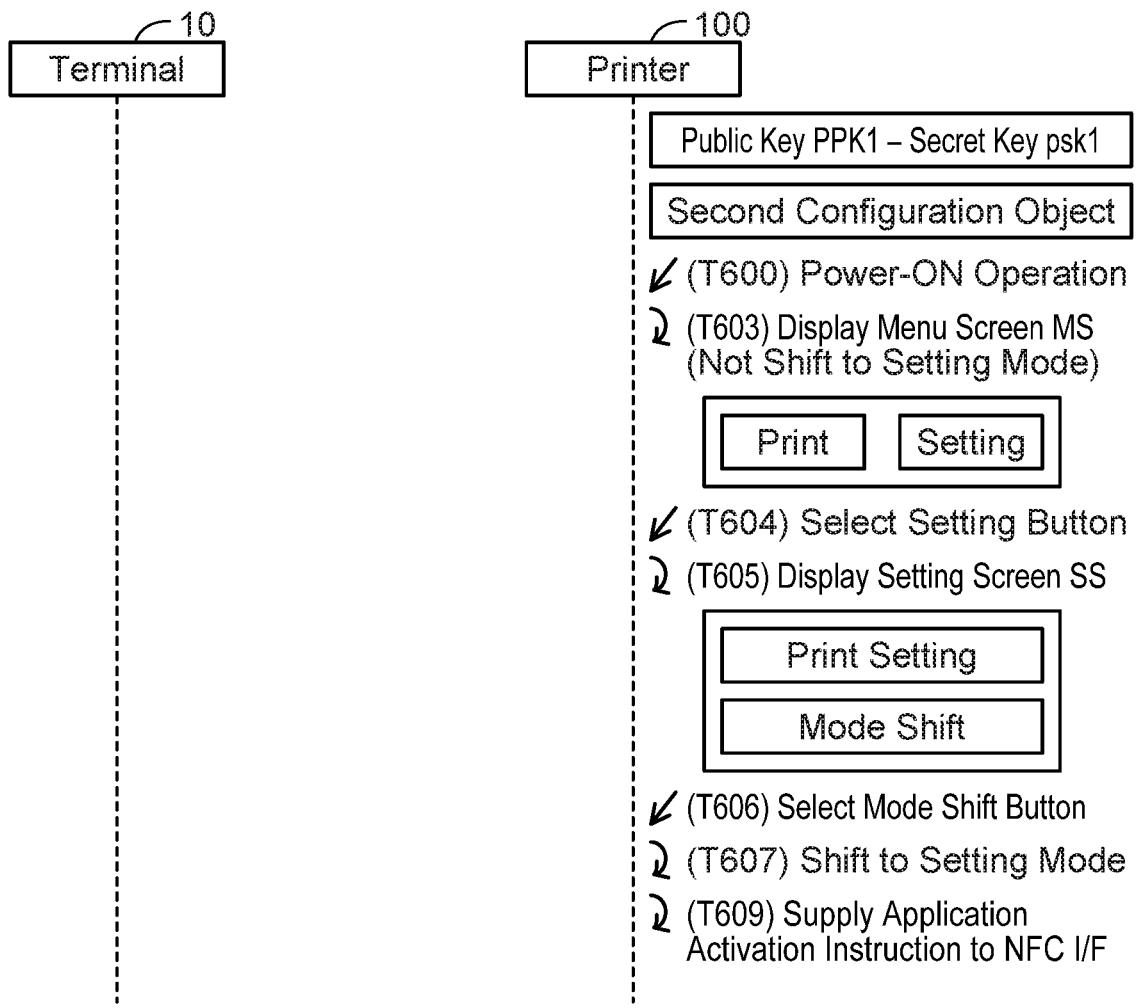
FIG. 8 shows a sequence diagram of a Bootstrapping process of Case C.

(Bootstrapping (BS) of Case C; FIG. 8)

Next, a process of the BS of another Case C will be described with reference to FIG. 8. Case C is a state after T20 to T40 of FIG. 2 are executed, that is, a state in which the memory 134 of the printer 100 has already stored the second CO.

T600 and T603 are similar to T100 and T105 of FIG. 3. In the present case, since the memory 134 of the printer 100 stores the second CO, the printer 100 does not shift the operation mode of the NFC I/F 118 from the non-setting mode to the setting mode. In the situation where the second CO is stored, the printer 100 can establish the Wi-Fi connection with the AP 6 by using the second CO. As such, a possibility that the BS is executed in the printer 100 is low. Under such a situation, the printer 100 does not shift the operation mode of the NFC I/F 118 to the setting mode, that is, it does not supply power to the NFC I/F 118, thus a power consumption can be reduced.

In the state where the printer 100 stores the second CO, the user may wish to establish a Wi-Fi connection between the printer 100 and an AP different from the AP 6, for example. In this case, the user selects the setting button in the menu screen MS in T604. In this case, the printer 100 causes the display unit 114 to display a setting screen SS in T605. The screen SS includes a print setting button for changing print settings of the printer 100 and a mode shift button for changing the operation mode of the NFC I/F 118. Then, in T606, the user selects the mode shift button in the screen SS. In this case, the printer 100 shifts the operation mode of the NFC I/F 118 in T607 from the non-setting mode to the setting mode. Due to this, the processes from T110 of FIG. 3 are executed in response to the terminal 10 being brought close to the printer 100 by the user. T609 is similar to T109 of FIG. 3.

The printer 100 can also establish a Wi-Fi connection with the AP 6 according to a normal Wi-Fi scheme (that is, a scheme that uses an SSID and a password) without using the DPP scheme. In this case, the memory 134 of the printer 100 stores wireless setting information (that is, the SSID and the password) for establishing the Wi-Fi connection with the AP 6. Under such a state, the printer 100 does not shift the operation mode of the NFC I/F 118 from the non-setting mode to the setting mode even when the power of the printer 100 is turned on, similarly to Case C of FIG. 8. This is because the printer 100 can establish the Wi-Fi connection with the AP 6 by using the wireless setting information. In such a situation as well, the power consumption can be reduced because power is not supplied to the NFC I/F 118.

(Process for connection with terminal 10; FIG. 9)

Next, a process for establishing a Wi-Fi connection between the terminal 10 and the printer 100 will be described with reference to FIGS. 9. T700 to T719 are similar to T100 to T119 of FIG. 3. In response to the "Connect with Terminal" button in the selection screen SLS being selected by the user in T720, the printer 100 shifts to the G/O state in T721, and creates an SSID "xxx" and a password that are to be used in a wireless network in which the printer 100 operates as the G/O. Then, in T722, the printer 100 supplies the NFC I/F 118 with an SSID sending instruction for instructing to send the SSID. This SSID sending instruction includes the created SSID "xxx". As a result, the SSID "xxx" is stored in the memory 119 in the NFC I/F 118.

T730 to T733 are similar to T130 to T133 of FIG. 3. In T734, the NFC I/F 118 of the printer 100 sends the SSID "xxx" in the memory 119 to the NFC I/F 18 of the terminal 10 by using the NFC connection established in T732. As a result, the SSID "xxx" is obtained by the terminal 10.

In T740, a search process for the terminal 10 to search a connection target device (that is, the printer 100) is executed. Specifically, following processes are executed. Firstly, the printer 100 receives via the Wi-Fi I/F 116 a Probe Request (hereinbelow simply termed "PReq") broadcasted from the terminal 10, and sends a Probe Response (hereinbelow simply termed "PRes") to the terminal 10. This PRes includes the SSID "xxx".

When the terminal 10 broadcasts the PReq, it receives a PRes from each of one or more devices including the printer 100. In this case, the terminal 10 specifies the printer 100, which is the connection target, by specifying the PRes that includes the SSID "xxx" acquired in T734 from among the one or more PRes. Then, the terminal 10 sends a PReq including the SSID "xxx" of the specified printer 100 to the printer 100 via the Wi-Fi I/F 16 (that is, it unicasts the PReq).

The printer 100 sends a PRes to the terminal 10 in response to receiving the PReq including the SSID "xxx" from the terminal 10 via the Wi-Fi I/F 116.

In T750, the printer 100 executes various types of communications (Association, WPS Negotiation, 4way-handshake) with the terminal 10. The printer 100 sends wireless setting information including the created SSID "xxx" and the created password to the terminal 10 in the WPS Negotiation. Then, the printer 100 uses the SSID "xxx" and the password to execute the 4way-handshake communication with the terminal 10 to establish the Wi-Fi connection with the terminal 10. Due to this, in response to the user performing on the terminal 10 a print operation for causing the printer 100 to execute printing in T760, the printer 100 can receive print data from the terminal 10 via the Wi-Fi I/F 116 in T762. Then, in T764, the printer 100 causes the print executing unit 120 to execute printing according to the received print data. When the process of T764 is completed, the process of FIG. 9 is terminated.

Effects of Embodiment

In this embodiment, the printer 100 displays the selection screen SLS (T116) in the case where the NFC connection with the terminal 10 is established (T112 of FIG. 3). The public key sending instruction is supplied to the NFC I/F 118 (T122) in the case where the "Connect with AP" button in the screen SLS is selected by the user (T120). As a result, the NFC I/F 118 sends the public key PPK1 to the terminal 10 (T134). Due to this, the printer 100 can receive the AReq from the terminal 10 (T200 of FIG. 4), send the ARes to the terminal 10 (T210), receive the second CO from the terminal 10 (T310 of FIG. 5), and establish the Wi-Fi connection with the AP 6 by using the second CO (T35, T40 of FIG. 2). On the other hand, in the case where the "Connect with AP" button in the screen SLS is not selected by the user (T720 of FIG. 9), the public key sending instruction is not supplied to the NFC I/F 118. Due to this, since the public key TPK1 is not sent to the terminal 10 via the NFC I/F 118, the printer 100 does not receive the AReq from the terminal 10, and thus does not establish the Wi-Fi connection with the AP 6. As above, whether or not to establish the Wi-Fi connection between the printer 100 and the AP 6 can be switched.

Further, in this embodiment, the printer 100 shifts from the non-respondent state to the respondent state (T124) after the NFC connection with the terminal 10 has been established (T112 of FIG. 3). Due to this, the printer 100 can receive the AReq from the terminal 10 (T200 of FIG. 4), send the ARes to the terminal 10 (T210), receive the second CO from the terminal 10 (T310 of FIG. 5), and establish the Wi-Fi connection with the AP 6 by using the second CO (T35, T40 of FIG. 2). The printer 100 does not shift to the respondent state, which has the higher processing load than the non-respondent state, before the NFC connection with the terminal 10 is established. Due to this, the processing load on the printer 100 can be reduced in the technique of establishing the Wi-Fi connection between the printer 100 and the AP 6 by using the terminal 10.

(Corresponding Relationships)

The printer 100, the terminal 10, and the AP 6 are respectively examples of "communication device", "first external device", and "second external device". The NFC I/F 118, the Wi-Fi I/F 116, and the CPU 132 are respectively examples of "first wireless interface", "second wireless interface", and "controller". The NFC connection in T112 of FIG. 3 (as well as T512 of FIGS. 7 and T712 of FIG. 9) and the Wi-Fi connection in T40 of FIG. 2 are respectively examples of "first wireless connection" and "second wireless connection". The selection screen SLS, the public key PPK1, and the public key sending instruction are respectively examples of "instruction screen", "public key", and "first instruction information". The process of FIG. 2 is an example of "target process". The AReq, the ARes, and the second CO are respectively examples of "authentication request", "authentication response", and "connection information". The Wi-Fi connection established in T40 of FIG. 2 is an example of "wireless connection".

The "Connect with AP" button in the setting screen SS, the "Connect with Terminal" button in the setting screen SS, and the Wi-Fi connection in T750 of FIG. 9 are respectively examples of "first selection area", "second selection area", and "third wireless connection". The memory 119 of NFC I/F 118, the NFC connection in T132 of FIG. 3, the NFC connection in T732, the SSID "xxx", and the SSID sending instruction are respectively example of "interface memory", "fourth wireless connection", "fifth wireless connection", "establishment information", and "second instruction information". The channel list, the communication channel used in T200 of FIG. 4, and the communication channel used in T40 of FIG. 2 are respectively examples of "communication channel information", "first communication channel", and "second communication channel". Accepting the power-ON operation by the user in the state where the second CO is not stored in the memory 134 and accepting the selection of the mode shift button by the user in the state where the second CO is stored in the memory 134 are examples of "predetermined condition". The non-setting mode and the setting mode are respectively examples of "first mode" and "second mode". The memory 134 is an example of "controller memory". The selecting operation on the mode shift button in T606 of FIG. 8 is an example of "specific operation". The app 40 and the app activation instruction are respectively examples of "application program" and "activation information". The SCont for AP and the hash value HV in the second CO are respectively examples of "received information" and "authentication information".

The process of T116 of FIG. 3 (as well as T516 of FIGS. 7 and T716 of FIG. 9), the process of T122 (as well as T522), the process of T200 of FIG. 4, the process of T210, the process of T310 of FIG. 5, and the processes of T35 and T40 of FIG. 2 are respectively examples of "cause the display unit to display an instruction screen", "supply, to the first wireless interface, first instruction information", "receive an authentication request from the first external device via the second wireless interface", "send an authentication response to the first external device via the second wireless interface", "receive connection information from the first external device via the second wireless interface", and "establish the second wireless connection between the communication device and the second external device via the second wireless interface".

The process of T124 of FIG. 3 (as well as T524 of FIG. 7), the process of T200 of FIG. 4, the process of T210, the process of T310 of FIG. 5, and the processes of T35 and T40 of FIG. 2 are respectively examples of "shift an operation state of the communication device from a non-respondent state to a respondent state", "receive an authentication request from the first external device via the second wireless interface", "send an authentication response to the first external device via the second wireless interface", "receive connection information from the first external device via the second wireless interface", and "establish the second wireless connection between the communication device and the second external device via the second wireless interface".

(Variant 1) In T122 of FIG. 3, the printer 100 may supply the NFC I/F 118 with a public key sending instruction that does not include the channel list nor the MAC address "abc" but includes the public key PPK1. In this case, in response to shifting from the non-respondent state to the respondent state in T124, the printer 100 monitors receipt of the AReq by using one wireless channel among all the wireless channels which the printer 100 is capable of using. Further, in T200 of FIG. 4, the terminal 10 sequentially broadcasts the AReq by sequentially using all the wireless channels which the terminal 10 is capable of using. That is, "first wireless interface" may send at least the public key to the first external device.

(Variant 2) The processes for creating the shared key (for example, SK1) (such as T142, T202 of FIG. 4) are not limited to the processes according to the ECDH described in the above embodiment, but may be other processes according to the ECDH. Further, the processes for creating the shared key are not limited to the processes according to the ECDH, and processes according to other schemes (such as Diffie-Hellman key exchange (DH)) may be executed instead. Further, in the above embodiment, the digital signatures DS1 and DS2 are created according to the ECDSA, however, they may be created according to other schemes (such as Digital Signature Algorithm (DSA), Rivest-Shamir-Adleman cryptosystem (RAS), etc.).

(Variant 3) The process of T721 of FIG. 9 may be omitted. In this case, the printer 100 supplies a MAC address sending instruction including the MAC address "abc" to the NFC I/F 118, instead of executing the process of T722. As a result, the MAC address "abc" is sent from the NFC I/F 118 of the printer 100 to the NFC I/F 18 of the terminal 10, and the MAC address "abc" is obtained by the terminal 10. Due to this, the terminal 10 can specify the printer 100, which is the connection target, in the search process by using the received MAC address "abc". After this, G/O Negotiation is executed between the terminal 10 and the printer 100, by which one of the terminal 10 and the printer 100 is determined to operate as a G/O and the other thereof is determined to operate as a client. Then, a process similar to T750 of FIG. 9 is executed between the terminal 10 and the printer 100, and the Wi-Fi connection is thereby established between the terminal 10 and the printer 100. In this variant, the MAC address sending instruction and the MAC address "abc" are respectively examples of "second instruction information" and "establishment information".

(Variant 4) The Wi-Fi I/F 116 of the printer 100 may not support the WFD scheme. In this case, for example, in T116 of FIG. 3, the printer 100 may cause the display unit 114 to display a printer-side confirmation screen PCS for confirming with the user to execute the connection process for establishing the Wi-Fi connection between the printer 100 and the AP 6, instead of the selection screen SLS. The screen PCS includes a YES button indicating that the connection process is to be executed. The printer 100 executes the processes from T122 in response to the YES button in the screen PCS being selected. In a case where the YES button in the screen PCS is not selected within a predetermined time, the printer 100 causes the display unit 114 to display the menu screen MS again without executing the processes from T122. In this variant, the printer-side confirmation screen PCS is an example of "instruction screen". Further, in this variant, "second selection area", "establish a third wireless connection between the communication device and the first external device via the second wireless interface" and "supply second instruction information to the first wireless interface" may be omitted. In another variant, the screen PCS may further include a NO button indicating that the connection process is not to be executed. In this case, in a case where the NO button in the screen PCS is selected by the user, the printer 100 causes the display unit 114 to display the menu screen MS again without executing the processes from T122. In this variant, the NO button in the screen PCS being selected is an example of "a case where it is not instructed that the target process is to be executed".

(Variant 5) The public key PPK1 of the printer 100, the channel list, and the MAC address "abc" may be stored in the memory 119 of the NFC I/F 118 in advance. Further, the printer 100 may not execute the process of T109 of FIG. 3. In this case, the processes of T110 and T112 are executed after the activation operation of the app 40 has been performed by the user and the app 40 has been activated in the terminal 10. At this time point, even if receiving a Read command from the terminal 10, the NFC I/F 118 is in the state of not sending the response to the Read command. As such, the NFC I/F 118 does not send the public key PPK1 of the printer 100, the channel list, and the MAC address "abc" in the memory 119. Further, in response to establishment of the NFC connection with the NFC I/F 18 of the terminal 10, the NFC I/F 118 of the printer 100 supplies the CPU 132 of the printer 100 with a notification indicating that the NFC connection has been established. The printer 100 (that is, the CPU 132) causes the display unit 114 to display the selection screen SLS in response to obtaining this notification from the NFC I/F 118. Then, the printer 100 supplies a public key sending instruction to the NFC I/F 118 in the case where the "Connect with AP" button in the screen SLS is selected by the user. This public key sending instruction does not include the public key PPK1 of the printer 100 and the like. Then, in response to receiving the Read command from the terminal 10 due to the terminal 10 having obtained the public key sending instruction, the NFC I/F 118 of the printer 100 shifts to the state of sending the response to the Read command. As such, the NFC I/F 118 sends the public key PPK1 of the printer 100, the channel list, and the MAC address "abc" in the memory 119 to the NFC I/F 18 of the terminal 10 by using the established NFC connection. In this variant, the NFC connection in T112 is an example of "first wireless connection". Further, in this variant, "activation information" may be omitted. Further, in this variant, "first instruction information" may not include the public key.

(Variant 6) The printer 100 may be provide with a different wireless interface according to a wireless scheme (such as a Bluetooth (registered trademark) scheme and a TransferJet scheme) different from the NFC scheme, instead of the NFC I/F 118. The Bluetooth scheme includes a Bluetooth scheme version 4.0 or higher (so-called Blue Tooth Low Energy). In this case, the printer 100 sends the public key PPK1, the channel list, and the MAC address "abc" to the terminal 10 via this wireless scheme, for example, in T134 of FIG. 3. In this variant, the wireless interface is an example of "first wireless interface".

(Variant 7) The NFC I/F 118 of the printer 100 may not be provided with the memory 119. In this case, in response to the establishment of the NFC connection with the NFC I/F 18 in T132 of FIG. 3, the NFC I/F 118 supplies the CPU 132 with a notification indicating that the NFC connection has been established. The printer 100 supplies the public key sending instruction to the NFC I/F 118 in response to obtaining this notification. As a result, the NFC I/F 118 of the printer 100 sends the public key PPK1 and the like in the public key sending instruction to the NFC I/F 18 of the terminal 10 by using the established NFC connection. In this variant, "interface memory" may be omitted. The aforementioned NFC communication may be a communication according to a Peer to Peer (P2P) mode of the NFC standard.

(Variant 8) In T35 of FIG. 2, the process of the NA may be executed between the terminal 10 and the printer 100, and a Wi-Fi connection may thereby be established between the terminal 10 and the printer 100. That is, "second external device" may be the same device as "first external device".

(Variant 9) The printer 100 may supply the app activation instruction and the public key sending instruction to the NFC I/F 118 in T109 of FIG. 3. In this case, the printer 100 shifts from the non-respondent state to the respondent state in response to obtaining the notification indicating that the NFC connection has been established from the NFC I/F 118 in T112. Further, in T114, the NFC I/F 118 sends the app activation instruction, the public key PPK1, the channel list, and the MAC address "abc" to the NFC I/F 18 of the terminal 10 by using the established NFC connection. After this, the processes from T136 are executed. Further, in another variant, the printer 100 may shift from the non-respondent state to the respondent state after the process of T134. In this case, the printer 100 shifts from the non-respondent state to the respondent state in response to obtaining from the NFC I/F 118 the notification indicating that the public key PPK1 have been sent. That is, the printer 100 may simply shift to the respondent state after the NFC connection has been established in T112.

(Variant 10) In T721 of FIG. 9, the printer 100 may operate as a so-called SoftAP, instead of operating as the G/O according to the WFD scheme. In this case, the printer 100 creates an SSID and a password that are to be used in a wireless network in which the printer 100 is to operate as the SoftAP, and supplies an SSID sending instruction including these SSID and password to the NFC I/F 118. As a result, in T734, the NFC I/F 118 sends these SSID and password to the NFC I/F 18 by using the established NFC connection. In this variant, the aforementioned SSID and password are examples of "establishment information".

(Variant 11) The NFC I/F 118 of the printer 100 may be configured to operate in the setting mode at all times. In this variant, "shift an operation mode of the first wireless interface from a first mode to a second mode" may be omitted.

(Variant 12) In the above embodiment, the Wi-Fi connection between the printer 100 and the AP 6 is established by using the terminal 10. Instead of this, for example, a Wi-Fi connection may be established between the printer 100 operating as a Group Owner (G/O) of the WFD scheme (that is, a device operating as a parent station) and another device (that is, a device operating as a child station) by using the terminal 10. That is, "second external device" may not be "parent station".

(Variant 13) "Communication device" may not be the printer, and may be another device such as a scanner, a multi-function peripheral, mobile terminal, a PC, and a server.

(Variant 14) In the embodiment above, the processes of FIGS. 2 to 9 are implemented by software (that is, the program 136), however, at least one of these processes may be implemented by hardware such as a logic circuit.

What is claimed is:

1. A communication device comprising:
a display unit;
a first wireless interface;
a second wireless interface different from the first wireless interface;
a processor; and
a memory storing computer-readable instructions therein, wherein the computer-readable instructions, when executed by the processor, cause the communication device to:
in a case where a first wireless connection is established between the communication device and a first external device via the first wireless interface, cause the display unit to display an instruction screen for instructing that a target process which includes sending of a public key is to be executed;
in a case where it is instructed that the target process is to be executed in a situation where the instruction screen is displayed, supply, to the first wireless interface, first instruction information for instructing the sending of the public key,
wherein in a case where it is not instructed that the target process is to be executed in the situation where the instruction screen is displayed, the first instruction information is not supplied to the first wireless interface, and wherein after the first instruction information has been obtained from the processor, the first wireless interface sends the public key to the first external device;
after the public key has been sent to the first external device, receive an authentication request in which the public key is used from the first external device via the second wireless interface;
in a case where the authentication request is received from the first external device, send an authentication response to the first external device via the second wireless interface;
after the authentication response has been sent to the first external device, receive connection information from the first external device via the second wireless interface, the connection information being for establishing a second wireless connection between the communication device and a second external device via the second wireless interface; and
in a case where the connection information is received from the first external device, establish, by using the connection information, the second wireless connection between the communication device and the second external device via the second wireless interface.

2. The communication device as in claim 1, wherein
the second external device is different from the first external device,
the instruction screen includes a first selection area corresponding to the target process and a second selection area corresponding to a process different from the target process, and
in a case where the first selection area is selected in the situation where the instruction screen is displayed, the first instruction information is supplied to the first wireless interface,
wherein the computer-readable instructions, when executed by the processor, further cause the communication device to:
in a case where the second selection area is selected in the situation where the instruction screen is displayed, establish a third wireless connection between the communication device and the first external device via the second wireless interface.

3. The communication device as in claim 2, wherein
the first wireless interface comprises an interface memory,
the first instruction information includes the public key,
in response to obtaining the first instruction information from the processor, the first wireless interface stores the public key included in the first instruction information in the interface memory, and
in a case where a fourth wireless connection is established between the communication device and the first external device via the first wireless interface after the first wireless connection has been disconnected and the public key has been stored in the interface memory, the first wireless interface sends the public key to the first external device by using the fourth wireless connection,
wherein the computer-readable instructions, when executed by the processor, further cause the communication device to:
in the case where the second selection area is selected in the situation where the instruction screen is displayed, supply second instruction information including establishment information for establishing the third wireless connection to the first wireless interface,
wherein in response to obtaining the second instruction information from the processor, the first wireless interface stores the establishment information included in the second instruction information in the interface memory, in a case where a fifth wireless connection is established between the communication device and the first external device via the first wireless interface after the first wireless connection has been disconnected and the establishment information has been stored in the interface memory, the first wireless interface sends the establishment information to the first external device via the first wireless interface by using the fifth wireless connection, and after the establishment information has been sent to the first external device, the third wireless connection is established between the communication device and the first external device via the second wireless interface by using the establishment information.

4. The communication device as in claim 1, wherein the computer-readable instructions, when executed by the processor, further cause the communication device to:

after the first wireless connection has been established, shift an operation state of the communication device from a non-respondent state to a respondent state, the non-respondent state being a state in which the authentication response is not sent in response to receiving the authentication request from the first external device, the respondent state being a state in which the authentication response is sent to the first external device in response to receiving the authentication request from the first external device, wherein in a case where the authentication request is received from the first external device after the operation state of the communication device has been shifted to the respondent state, the authentication response is sent to the first external device via the second wireless interface.

5. The communication device as in claim 4, wherein the first wireless interface sends, to the first external device, the public key and communication channel information indicating a first communication channel which is predetermined at the communication device, the respondent state is a state in which receipt of the authentication request by using the first communication channel is monitored and the authentication response is sent to the first external device in response to receiving the authentication request from the first external device, and in a case where the authentication request by using the first communication channel is received from the first external device after the operation state of the communication device has been shifted to the respondent state, the authentication response is sent to the first external device via the second wireless interface.

6. The communication device as in claim 5, wherein the second wireless connection is established between the communication device and the second external device via the second wireless interface by using a second communication channel different from the first communication channel.

7. The communication device as in claim 1, wherein in a case where the first wireless connection is disconnected and a fourth wireless connection is established between the communication device and the first external device via the first wireless interface, the first wireless interface sends the public key to the first external device by using the fourth wireless connection.

8. The communication device as in claim 7, wherein the first wireless interface comprises an interface memory, the first instruction information includes the public key, in response to obtaining the first instruction information from the processor, the first wireless interface stores the public key included in the first instruction information in the interface memory, and in a case where a fourth wireless connection is established after the first wireless connection has been disconnected and the public key has been stored in the interface memory, the first wireless interface sends the public key to the first external device by using the fourth wireless connection.

9. The communication device as in claim 1, wherein the computer-readable instructions, when executed by the processor, further cause the communication device to:

in a case where a predetermined condition is satisfied, shift an operation mode of the first wireless interface from a first mode which is incapable of establishing a wireless connection via the first wireless interface to a second mode which is capable of establishing a wireless connection via the first wireless interface.

10. The communication device as in claim 9, wherein the computer-readable instructions, when executed by the processor, further cause the communication device to:

in the case where the connection information is received from the first external device, store the connection information in the memory, wherein in a case where the communication device is turned on in a situation where the connection information is not stored in the memory, the predetermined condition is satisfied, and in a case where the communication device is turned on in a situation where the connection information is stored in the memory, the predetermined condition is not satisfied.

11. The communication device as in claim 10, further comprising:

an operation unit, wherein the predetermined condition is satisfied in a case where a specific operation is accepted via the operation unit in the situation where the connection information is stored in the memory.

12. The communication device as in claim 1, wherein the first wireless interface sends activation information to the first external device by using the first wireless connection in the case where the first wireless connection is established, the activation information being for activating an application program installed in the first external device, and the authentication request which is sent from the first external device according to the application program is received.

13. The communication device as in claim 1, wherein the first wireless interface is a tag interface according to a Near Field Communication (NFC) scheme.

14. The communication device as in claim 1, wherein the second external device is different from the first external device and is a parent device that is to operate as a parent station in a wireless network, and the second wireless connection is established between the communication device and the second external device via the second wireless interface such that the communication device participates in the wireless network as a child station.

15. The communication device as in claim 1, wherein the connection information includes authentication information for authenticating received information which is received from the second external device.

16. The communication device as in claim 1, wherein the computer-readable instructions, when executed by the processor, further cause the communication device to:
after the authentication response has been sent to the first external device, cause the communication device to operate as an Enrollee according to a Wi-Fi standard, wherein the first external device operates as a Configurator according to the Wi-Fi standard.

17. A communication device comprising:
a first wireless interface;
a second wireless interface different from the first wireless interface;
a processor; and
a memory storing computer-readable instructions therein, wherein the computer readable instructions, when executed by the processor, cause the communication device to:
after a first wireless connection has been established between the communication device and a first external device via the first wireless interface, shift an operation state of the communication device from a non-respondent state to a respondent state, the non-respondent state being a state in which an authentication response is not sent in response to receiving an authentication request in which a public key is used from the first external device, the respondent state being a state in which the authentication response is sent to the first external device in response to receiving the authentication request from the first external device,
wherein after the first wireless connection has been established, the first interface sends the public key to the first external device;
after the public key has been sent to the first external device, receive the authentication request from the first external device via the second wireless interface;
in a case where the authentication request is received from the first external device after the operation state of the communication device has been shifted to the respondent state, send the authentication response to the first external device via the second wireless interface;
after the authentication response has been sent to the first external device, receive connection information from the first external device via the second wireless interface, the connection information being for establishing a second wireless connection between the communication device and a second external device via the second wireless interface; and
in a case where the connection information is received from the first external device, establish, by using the connection information, the second wireless connection between the communication device and the second external device via the second wireless interface.

18. A non-transitory computer-readable recording medium storing computer-readable instructions for a communication device,
wherein the computer-readable instructions, when executed by a processor of the communication device, cause the communication device to:
in a case where a first wireless connection is established between the communication device and a first external device via a first wireless interface of the communication device, cause a display unit of the communication device to display an instruction screen for instructing that a target process which includes sending of a public key is to be executed;
in a case where it is instructed that the target process is to be executed in a situation where the instruction screen is displayed, supply, to the first wireless interface, first instruction information for instructing the sending of the public key,
wherein in a case where it is not instructed that the target process is to be executed in the situation where the instruction screen is displayed, the first instruction information is not supplied to the first wireless interface;
after the first instruction information has been supplied to the first wireless interface and the public key has been sent from the first wireless interface to the first external device, receive an authentication request in which the public key is used from the first external device via a second wireless interface of the communication device, the second wireless interface being different from the first wireless interface;
in a case where the authentication request is received from the first external device, send an authentication response to the first external device via the second wireless interface;
after the authentication response has been sent to the first external device, receive connection information from the first external device via the second wireless interface, the connection information being for establishing a second wireless connection between the communication device and a second external device via the second wireless interface; and
in a case where the connection information is received from the first external device, establish, by using the connection information, the second wireless connection between the communication device and the second external device via the second wireless interface.

* * * * *

UNITED STATES PATENT AND TRADEMARK OFFICE
CERTIFICATE OF CORRECTION

PATENT NO. : 11,395,137 B2  
APPLICATION NO. : 16/360132  
DATED : July 19, 2022  
INVENTOR(S) : Hiroshi Shibata Page 1 of 1

It is certified that error appears in the above-identified patent and that said Letters Patent is hereby corrected as shown below:

In the Claims

Column 22, Claim 8, Line 8:
Please delete "a fourth wireless connection" and insert --the fourth wireless connection--

Signed and Sealed this
Twenty-fourth Day of January, 2023

Katherine Kelly Vidal
*Director of the United States Patent and Trademark Office*